March 30, 1926.
H. PEARL
STRAINER FOR POT COVERS
Filed May 27, 1924
1,578,466
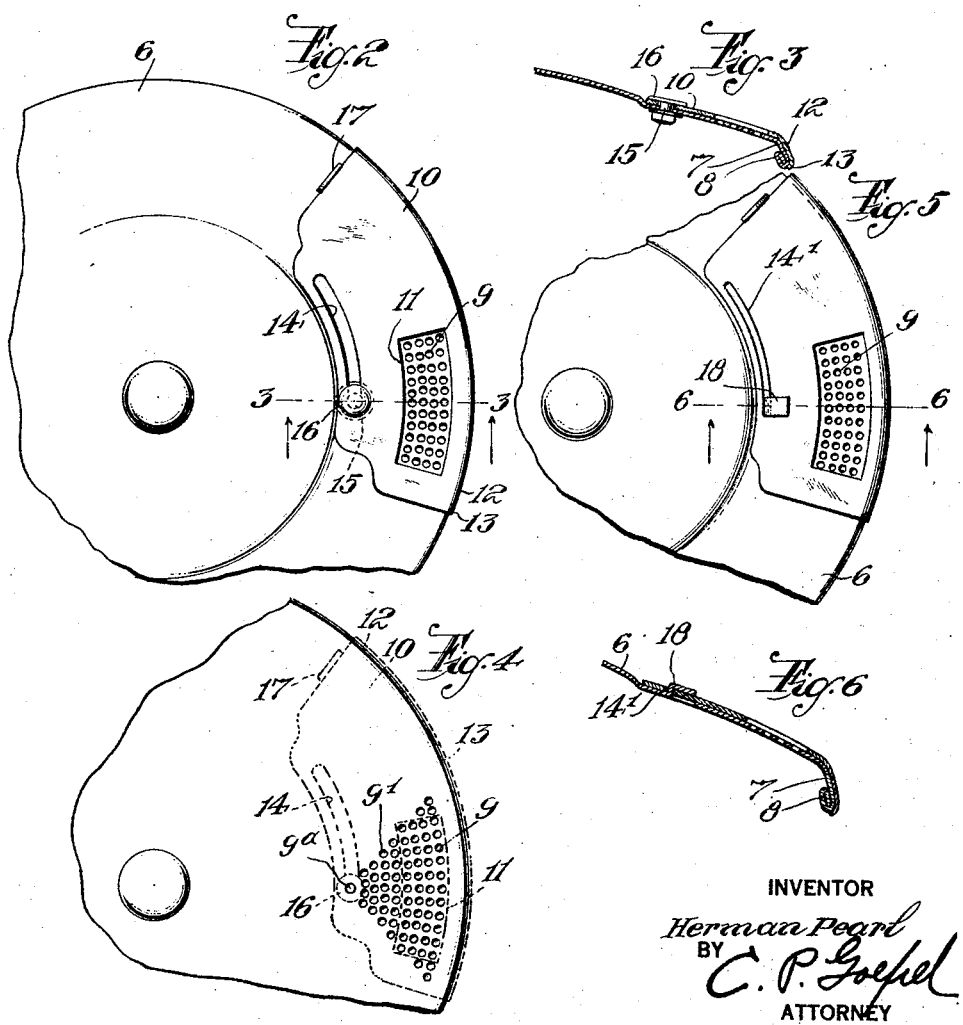
INVENTOR
Herman Pearl
BY
C. P. Goefel
ATTORNEY Patented Mar. 30, 1926.

1,578,466

UNITED STATES PATENT OFFICE.

HERMAN PEARL, OF MORRIS PARK, NEW YORK.

STRAINER FOR POT COVERS.

Application filed May 27, 1924. Serial No. 716,255.

*To all whom it may concern:*

Be it known that I, HERMAN PEARL, a citizen of the United States, and resident of Morris Park, Long Island, county of Queens, and State of New York, have invented certain new and useful Improvements in Strainers for Pot Covers, of which the following is a specification.

This invention relates to an improved strainer for pot covers and has for its primary object to provide a device of this character embodying an adjustable plate and cover means for mounting said plate upon the pot cover for movement over a plurality of steam outlet openings whereby any desired number of such openings may be closed to restrict the emission of steam.

It is a further object of the invention to provide in one embodiment thereof a detachable mounting of the shiftable plate so that when it is not desired to use said plate the housewife may readily detach the same from the cover so that the latter will have the appearance of an ordinary pot cover provided with straining openings.

It is also a further general object of my invention to provide a device of the above character which is simple and durable in its construction, and will not greatly add to the manufacturing cost of the pot cover.

With the above and other objects in view, the invention consists in the improved form, construction and relative arrangement of the several parts as will be hereinafter more fully described, illustrated in the accompanying drawing and subsequently incorporated in the subjoined claim.

In the drawing wherein I have illustrated several desirable embodiments of the invention and in which similar reference characters designate corresponding parts throughout the several views.

Figure 1 is a side elevation of a cooking pot having a cover provided with the improved straining device;

Figure 2 is a top plan view;

Figure 3 is a section taken on the line 3—3 of Fig. 2;

Figure 4 is a plan view of the cover with the adjustable plate removed and illustrating another embodiment of the invention;

Figure 5 is a plan view similar to Figure 4 showing a further modification, and

Figure 6 is a section taken on the line 6—6 of Fig. 5.

Referring in detail to the drawing and more particularly to Figures 1, 2 and 3 thereof, 5 designates the body of the pot, said pot being provided with a removable cover 6. This cover is formed with a curved marginal flange 7, the edge of said flange being inwardly bent upon itself to provide a bead 8 which is adapted for engagement under a reinforcing bead formed on the upper edge of the body wall of the pot.

The wall of the pot cover 6 is provided in one section thereof with a multiplicity of straining openings or perforations 9. A sheet metal plate 10 is circumferentially shiftable upon the cover wall and is provided with an elongated opening 11 through which all of the openings or perforations 9 in the cover wall are exposed in one position of said plate, as seen in Fig. 2 of the drawing. The outer edge of this plate 10 is flanged as at 12, said flange snugly fitting upon the flange 7 of the pot cover and having its extreme edge inwardly turned as at 13, under the bead 8. This edge portion 13 of the plate 10 does not, however, extend inwardly to such a distance that it will in any way obstruct the proper engagement of the bead 8 with the bead on the upper edge of the body wall.

The plate 10 is further provided in spaced relation to its inner edge with a longitudinally extending slot 14 through which a stud or shank 15 fixed in the wall of the cover extends. This stud has a broad flat head 16 which affords an extensive bearing upon the upper surface of the plate 10 and effectually prevents movement of said plate vertically with respect to the cover wall. The flange 12 of the shiftable plate extending the full length of said plate and upon each side of the guide stud 15, by its bearing contact on the flange 7, prevents pivotal movement of the adjustable plate on said stud.

At one end the plate 10 is preferably formed with an upstanding finger piece 17 by means of which said plate may be conveniently shifted.

When the plate 10 is in the position seen in Figure 2 of the drawing, all of the openings or perforations 9 are uncovered and the liquid may be strained from the contents of the pot or vessel through said perforations and the opening 11 in the adjustable plate. At the start of the cooking operation the plate 10 is shifted from its illustrated position so that said plate extends over and closes all of the perforations 9, thus preventing the escape of the steam. Subsequently, this plate may be adjusted to permit of the escape of a portion of the steam from the pot by uncovering a greater or less number of the perforations 9 so that the food will not be overcooked.

In some cases the housewife may prefer a cover simply provided with the straining openings and without the adjustable steam control plate. I, therefore, contemplate arranging the openings or perforations in the cover in triangular form, as shown at 9', in Figure 4 of the drawing. The inner opening $9^a$ at the apex of the triangular group of perforations is of slightly greater diameter than the remaining perforations, though the difference is scarcely noticeable. This opening $9^a$ may receive the guide bolt or stud for the slide plate 10, said stud having a threaded inner end to receive a clamping nut. Thus the guide stud and the plate 10 can be easily removed from the pot cover and the bolt receiving opening $9^a$ will then appear to be merely one of the group of straining openings 9' so that the appearance of the cover will not be otherwise affected by the removal of the slide plate.

In Figs. 5 and 6 I have illustrated another alternative construction, in which instead of providing the guide bolt or stud 15, an angular tongue 18 is struck upwardly from the wall of the cover 6, the vertically extending portion of said tongue being engaged through the slot 14' in the slide plate, while the horizontal portion of the tongue bears upon the upper surface of said plate at the outer edge of the slot.

From the foregoing description considered in connection with the accompanying drawing, the construction and manner of operation of the several illustrated forms of the invention will be clearly understood. It will be seen that I have provided an adjustable means for opening and closing the straining openings which is very simple in its construction, not likely to become loose or displaced from its proper position upon the pot cover and which is very convenient and serviceable in practical use. I have herein shown and described a construction and mounting of the adjustable plate which I have found very satisfactory but it will be evident that this plate might be produced in other forms, and various other equivalent devices employed for retaining the said plate in its applied position on the cover. It is accordingly to be understood that while I have herein described certain preferable embodiments of the invention, the device is susceptible of exemplification in numerous alternative structures and I, therefore, reserve the privilege of adopting all such legitimate changes in the form, proportion and relative arrangement of the several parts as may be fairly embodied within the spirit and scope of the invention as claimed.

I claim:

In combination with a pot cover having a plurality of spaced perforations in its wall and provided with a continuous marginal flange projecting downwardly at an angle to the body of the cover and terminating in an inwardly turned bead, a slide plate closely contacting upon the upper surface of the cover and having an opening therein through which a greater or less number of said perforations may be exposed, said plate also having an angularly disposed flange on one edge extending the entire length of said plate and closely overlying the flange on said cover, the edge of the flange on said plate extending inwardly upon the bead of the cover flange, said plate adjacent its inner edge having a longitudinally extending slot therein, and guide means on the cover engaged through said slot to limit the sliding movement of said plate and to retain the flange on said plate in contact throughout its length with the flange on said cover.

In testimony that I claim the foregoing as my invention, I have signed my name hereunder.

HERMAN PEARL.